United States Patent
Griffo

(10) Patent No.: US 7,392,865 B2
(45) Date of Patent: *Jul. 1, 2008

(54) RANDOMLY-ORIENTED COMPOSITE CONSTRUCTIONS

(75) Inventor: Anthony Griffo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/778,952

(22) Filed: Jul. 17, 2007

(65) Prior Publication Data

US 2007/0272448 A1    Nov. 29, 2007

Related U.S. Application Data

(63) Continuation of application No. 10/726,387, filed on Dec. 2, 2003, now Pat. No. 7,243,744.

(51) Int. Cl.
*E21B 10/46* (2006.01)

(52) U.S. Cl. .................. 175/426; 175/375; 175/434; 175/435

(58) Field of Classification Search .................. None
See application file for complete search history.

(56) References Cited

U.S. PATENT DOCUMENTS

| | | | |
|---|---|---|---|
| 4,017,480 A | 4/1977 | Baum | |
| 4,142,888 A | 3/1979 | Rozmus | |
| 4,255,165 A | 3/1981 | Dennis et al. | |
| 4,341,557 A | 7/1982 | Lizenby | |
| 4,368,788 A | 1/1983 | Drake | |
| 4,372,404 A | 2/1983 | Drake | |
| 4,378,975 A | 4/1983 | Tomlinson et al. | |
| 4,398,952 A | 8/1983 | Drake | |
| 4,428,906 A | 1/1984 | Rozmas | |

(Continued)

FOREIGN PATENT DOCUMENTS

EP    0 012 631 A1    6/1980

(Continued)

OTHER PUBLICATIONS

*Flaw Tolerant, Fracture Resistant, Non-Brittle Materials Produced via Conventional Powder Processing,* Technological Advances, Jul./Aug. 1995, Matrice Technology Ltd., vol. 10, No. 7/8, p. 131-134.
*Research & Development Summaries,* Advance Ceramics Research, Aug. 18, 1996, 4 Summaries, 2 to 3 pages each.

*Primary Examiner*—Zakiya W. Bates
(74) *Attorney, Agent, or Firm*—Connolly Bove Lodge & Hutz LLP

(57) ABSTRACT

Composite constructions comprise a plurality of granules that are arranged together in a randomly-oriented manner. The granules each comprise an ordered arrangement of a first material phase and a second material phase, wherein the first and second material phases are each continuous, and each occupy different and distinct regions of the granule. At least a portion of the first and second material phases of each granule are in contact with one another. The first material phase comprises a material selected from the group consisting of cermet materials, polycrystalline diamond, polycrystalline cubic boron nitride, and mixtures thereof. The second material phase comprises a material that is relatively softer, e.g., more ductile, than the first material phase.

20 Claims, 6 Drawing Sheets

U.S. PATENT DOCUMENTS

| | | |
|---|---|---|
| 4,525,178 A | 6/1985 | Hall |
| 4,593,776 A | 6/1986 | Salesky et al. |
| 4,604,106 A | 8/1986 | Hall et al. |
| 4,656,002 A | 4/1987 | Lizenby et al. |
| 4,673,549 A | 6/1987 | Ecer |
| 4,694,918 A | 9/1987 | Hall |
| 4,723,996 A | 2/1988 | Brunet et al. |
| 4,772,524 A | 9/1988 | Coblenz |
| 4,797,241 A | 1/1989 | Peterson |
| 4,866,885 A | 9/1989 | Dodsworth |
| 4,945,073 A | 7/1990 | Dubensky et al. |
| 5,089,182 A | 2/1992 | Findeisen et al. |
| 5,096,465 A | 3/1992 | Chen et al. |
| 5,271,749 A | 12/1993 | Rai et al. |
| 5,290,507 A | 3/1994 | Runkle |
| 5,304,342 A | 4/1994 | Hall, Jr. et al. |
| 5,326,380 A | 7/1994 | Yao et al. |
| 5,370,195 A | 12/1994 | Keshavan et al. |
| 5,419,868 A | 5/1995 | Honnorat |
| 5,441,817 A | 8/1995 | Rai |
| 5,453,105 A | 9/1995 | Middlemiss et al. |
| 5,492,186 A | 2/1996 | Overstreet et al. |
| 5,598,621 A | 2/1997 | Littecke et al. |
| 5,645,781 A | 7/1997 | Popovic' et al. |
| 5,662,183 A | 9/1997 | Fang |
| 5,676,496 A | 10/1997 | Littecke et al. |
| 5,712,030 A | 1/1998 | Goto et al. |
| 5,755,299 A | 5/1998 | Langford |
| 5,813,105 A | 9/1998 | Littecke et al. |
| 5,830,813 A | 11/1998 | Yao et al. |
| 5,880,382 A | 3/1999 | Fang et al. |
| 5,944,127 A | 8/1999 | Liang et al. |
| 6,063,502 A | 5/2000 | Sue et al. |
| 6,102,140 A | 8/2000 | Boyce et al. |
| 6,187,068 B1 | 2/2001 | Frushour et al. |
| 6,258,139 B1 | 7/2001 | Jensen |
| 6,290,008 B1 | 9/2001 | Portwood et al. |
| 6,325,165 B1 | 12/2001 | Eyre |
| 6,361,873 B1 | 3/2002 | Yong et al. |
| 6,454,027 B1 | 9/2002 | Fang et al. |
| 6,592,985 B2 | 7/2003 | Griffin |
| 6,607,835 B2 | 8/2003 | Fang et al. |
| 6,696,137 B2 | 2/2004 | Fong |

FOREIGN PATENT DOCUMENTS

| | | |
|---|---|---|
| EP | 0 052 922 | 6/1982 |
| EP | 0 365 843 A1 | 5/1990 |
| EP | 0 774 527 | 5/1997 |
| EP | 0 278 793 | 8/1998 |
| GB | 1572460 | 7/1980 |
| GB | 1574615 | 9/1980 |
| GB | 2 239 028 | 6/1991 |
| GB | 2 286 599 | 8/1995 |
| GB | 2 315 775 | 11/1998 |
| GB | 2 315 778 | 11/1998 |
| JP | 62-274034 | 11/1987 |
| JP | 8-49037 | 2/1996 |
| WO | WO 81/03295 | 11/1981 |
| WO | WO 96/36465 | 11/1996 |
| WO | WO 2004/040029 A1 | 5/2004 |
| WO | WO 2004/111284 A2 | 12/2004 |

US 7,392,865 B2

RANDOMLY-ORIENTED COMPOSITE CONSTRUCTIONS

COPENDING PATENT APPLICATION

This patent application is a Continuation of U.S. patent application Ser. No. 10/726,387, filed Dec. 2, 2003, now U.S. Pat. No. 7,243,744 which is incorporated hereby in its entirety.

FIELD OF THE INVENTION

This invention relates generally to composite constructions comprising two or more material phases and, more particularly, to composite constructions having a material microstructure comprising a randomly-oriented arrangement of particles that each comprise an ordered arrangement of two or more material phases.

BACKGROUND OF THE INVENTION

Cermet materials such as cemented tungsten carbide (WC-Co) are well known for their mechanical properties of hardness, toughness and wear resistance, making them a popular material of choice for use in such industrial applications as cutting tools for machining, mining and drilling where such mechanical properties are highly desired. Cemented tungsten carbide, because of its desired properties, has been a dominant material used in such applications as cutting tool surfaces, hard facing, wear components in roller cone rock bit inserts, cutting inserts in roller cone rock bits, and as the substrate body for drag bit shear cutters. The mechanical properties associated with cemented tungsten carbide and other cermet materials, especially the unique combination of hardness, toughness and wear resistance, make this class of materials more desirable than either metal materials or ceramic materials alone.

For conventional cemented tungsten carbide, the mechanical property of fracture toughness is inversely proportional to hardness, and wear resistance is proportional to hardness. Although the fracture toughness of cemented tungsten carbide has been somewhat improved over the years, it is still a limiting factor in demanding industrial applications such as high penetration drilling, where cemented tungsten carbide inserts often exhibit gross brittle fracture that can lead to catastrophic failure. Traditional metallurgical methods for enhancing fracture toughness, such as grain size refinement, cobalt content optimization, and use of strengthening agents, have been substantially exhausted with respect to conventional cemented tungsten carbide.

The mechanical properties of commercial grade cemented tungsten carbide can be varied within a particular envelope by adjusting the cobalt metal content and the tungsten carbide grain sizes. For example, the Rockwell A hardness of cemented tungsten carbide can be varied from about 85 to 94, and the fracture toughness can be varied from about 8 to 19 MPam$^{-2}$. Applications of cemented tungsten carbide are limited to this envelope.

Polycrystalline diamond is another type of material that is known to have desirable properties of hardness, and wear resistance, making it especially suitable for those demanding applications described above where high wear resistance is desired. However, this material also suffers from the same problem as cemented tungsten carbide, in that it also displays properties of low fracture toughness that can result in gross brittle failure during usage.

It is, therefore, desirable that a composite construction be developed that has improved properties of fracture toughness, when compared to conventional single phase cermet materials such as cemented tungsten carbide materials, and when compared to single phase conventional materials formed from polycrystalline diamond or polycrystalline cubic boron nitride. It is desirable that such composite construction have such improved fracture toughness without sacrificing other desirable properties of wear resistance and hardness associated with conventional single phase cemented tungsten carbide, polycrystalline diamond, and polycrystalline cubic boron nitride materials. It is desired that such composite constructions be adapted for use in such applications as roller cone bits, hammer bits, drag bits and other mining, construction and machine applications where properties of improved fracture toughness is desired.

SUMMARY OF THE INVENTION

Composite constructions of this invention comprise a material microstructure made up of a plurality of granules that are combined together with one another in a randomly-oriented manner. The granules each comprise an ordered arrangement of a first material phase and a second material phase. The first and second material phases are each continuous, and each occupies different and distinct regions of the granule.

At least a portion of the first and second material phases of each granule are in contact with one another. The granules can be configured differently so that the material phases have different shapes and sizes. In an example embodiment, the granules are configured having a centrally-positioned core formed from one of the material phases, and a surrounding shell portion formed from the other of the material phases. The core and shell are each formed from one of the first and second material phases.

The first material phase comprises a hard material selected from the group consisting of cermet materials, polycrystalline diamond, polycrystalline cubic boron nitride, and mixtures thereof. The second material phase comprises a material that is relatively softer, e.g., more ductile, than the first material phase. In an example embodiment, the first material phase is formed from polycrystalline diamond and the second material phase is formed from cemented tungsten carbide.

The ordered structure of the granules are formed while the granules are in a green state, and the granules can be combined with one another with or without a continuous binder. The combined granules are consolidated and sintered to provide a final material microstructure comprising a random arrangement of the granules, on a macro scale, and an ordered arrangement of material phases making up the granules, on a micro scale. The composite material microstructure of a random arrangement of such granules operates synergistically to impair crack propagation through the composite construction, thereby providing a desired improvement in material toughness.

DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

Composite constructions of this invention have a specifically engineered material microstructure comprising a plurality of randomly arranged particles or granules that each itself includes an ordered arrangement of two or more continuous material phases. This random arrangement of such granules provides a microstructure having improved properties of chipping resistance and toughness when compared to conventional single phase cermet material constructions, and when compared to composite constructions having structural units arranged in an ordered or oriented fashion.

Cermet materials are materials that comprise both a ceramic material and a metal material. Examples ceramic materials useful for forming composite constructions of this invention generally include carbides, borides, nitrides, diamond, and cubic boron nitride. An example cermet material is cemented tungsten carbide (WC-Co) that is made from tungsten carbide (WC) grains and cobalt (Co). Another class of cermet materials is polycrystalline diamond (PCD) and polycrystalline cubic boron nitride (PCBN) that are synthesized by high temperature/high pressure processes.

Figure 1:
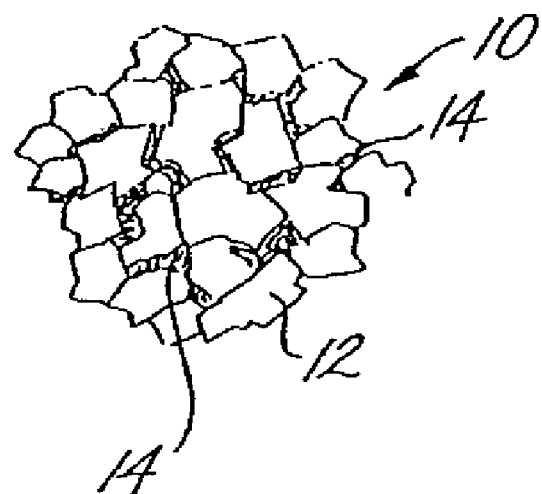
FIG. 1 is a schematic photomicrograph of a region of conventional cemented tungsten carbide.

FIG. 1 illustrates a material microstructure for conventional single-phase cemented tungsten carbide 10. Such conventional material microstructure comprises tungsten carbide grains 12 that are bonded to one another by a cobalt phase 14. As illustrated, the tungsten carbide grains can be bonded to other grains of tungsten carbide, thereby having a tungsten carbide/tungsten carbide interface, and/or can be bonded to the cobalt phase, thereby having a tungsten carbide/cobalt interface. The unique properties of cemented tungsten carbide result from this combination of a rigid carbide network with a tougher metal substructure. The generic microstructure of cemented tungsten carbide, a heterogeneous composite of a ceramic phase in combination with a metal phase, is similar in all cermets.

The relatively low fracture toughness of cemented tungsten carbide has proved to be a limiting factor in more demanding applications, such as inserts in roller cone rock bits, hammer bits and drag bits used for subterranean drilling and the like. It is possible to increase the toughness of the cemented tungsten carbide by increasing the amount of cobalt present in the composite. The toughness of the composite mainly comes from plastic deformation of the cobalt phase during the fracture process. Yet, the resulting hardness of the composite decreases as the amount of ductile cobalt increases. In most commonly used cemented tungsten carbide grades, cobalt is no more than about 20 percent by weight of the total composite.

As evident from FIG. 1, the cobalt phase is not continuous in the conventional cemented tungsten carbide microstructure, particularly in compositions having a low cobalt concentration. The conventional cemented tungsten carbide microstructure has a relatively uniform distribution of tungsten carbide grains in a cobalt matrix. Thus, a crack propagating within the composite will often travel through the less ductile tungsten carbide grains, either transgranularly through tungsten carbide/cobalt interfaces or intergranularly through tungsten carbide/tungsten carbide interfaces. As a result, cemented tungsten carbide often exhibits gross brittle fracture during more demanding applications, which may lead to catastrophic failure.

Composite constructions of this invention are formed from a plurality of particles, e.g., granules, that are each specifically formed having an ordered arrangement of two or more material phases, e.g., a hard phase material and a relatively softer or binder phase material. The particle material phases can be formed from different materials or can be formed from the same general type of material present in a different material proportion and/or having a different grain size to render a desired relative difference in hardness and or ductility.

As used herein, the term "ordered" is understood to refer to the fact that the material phases of the particle are not combined with one another in a random manner. Rather, the material phases are intentionally arranged in a predetermined manner to form different respective portions or distinct regions of the particle. In each case, the material phases are ordered in the sense that they each occupy the same distinct portion or region of each particle, thus are arranged or combined together in a predetermined, rather than a random, fashion. In some cases, the ordered arrangement of the particle material phases can be oriented relative to say an axis or other common reference point of the particle.

The particle or granule hard material phase can be formed from the group of materials including cermet materials, PCD, PCBN and the like, and the granule relatively softer material phase can be formed from different materials such as metals and metal alloys. Alternatively, the hard and soft material phases can be formed from the same general type of materials, having different material proportions and/or grain sizes as needed to make one material phase relatively softer and/or more ductile than the other. For example, the relatively softer granule material phase can be formed from the same type of material used to form the harder granule material phase, only having a larger proportion of a metal or metal alloy constituent.

Depending on the particular invention application, the material phases used to form the particles or granules can take on different geometric forms. In one example embodiment, the hard material phase can be provided in the form of a centrally-located core, and the relatively softer material phase can be provided in the form of a shell that at least partially surrounds the core, or visa versa. Alternatively, the hard and soft material phases can each be provided in the form of different sheets that are each formed from a respective hard and soft material. It is to be understood that the specific shape and/or manner in which the particle material phases are arranged can and will vary depending on the particular composite construction application.

As mentioned above, the fracture toughness of conventional cemented tungsten carbide or other cermets is generally controlled by the ductile metal binder (e.g., cobalt) component of the material. Plastic deformation of the binder phase during the crack propagation process accounts for more than 90 percent of the fracture energy. A problem know to occur during the manufacture of certain conventional cermet constructions is the depletion of the binder material. Such depletion is generally undesired as it operates to reduce the extent to which the ductile binder component can participate in mitigating crack propagation.

Composite constructions of this invention are specifically designed to have a material microstructure comprising a three-dimensional network made up of a randomly oriented arrangement of the particles. As mentioned above, each of the particles comprise an ordered arrangement of two or more materials phases. This intentionally configured material microstructure operates to provide an improved degree of chipping resistance, i.e., resistance to crack propagation. The improvement in chipping resistance is due to the increased amount of energy that is required to propagate a crack through the microstructure as a result of the ordered arrangement of material phases. Composite constructions of this invention benefit from the short range ordering of the particles that operate to reduce local chipping and minimize cracking perpendicular to the working surface due to the random distribution of ordered segments disposed along the working surface.

For example, a roller cone rock bit insert comprising composite constructions of this invention, i.e., having the composite construction disposed along an insert working surface, are known to display improved properties of chipping resistance and increased fracture toughness when compared to conventional cemented tungsten carbide compositions, thereby resulting in extended service life.

As discussed briefly above, the ordered arrangement of material phases forming particles or granules useful for forming composite constructions of this invention may be derived from differently configured multi-material phase components. U.S. Pat. No. 4,772,524 discloses at least two such components found to be particularly useful in forming composite constructions of this invention, which patent is hereby incorporated by reference.

Figure 2:
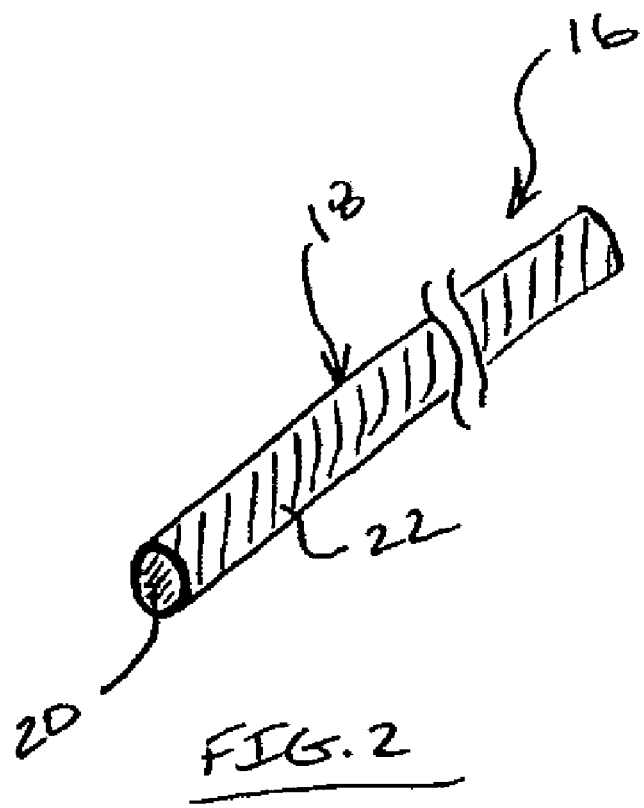
FIG. 2 is a perspective side view of a first embodiment ordered multi-material phase component useful for forming randomly-oriented composite constructions of this invention.

FIG. 2 illustrates a first embodiment ordered multi-material phase component 16 useful for forming composite constructions of this invention. The component 16 is provided in the form of a cased or coated fiber 18. Each fiber 18 comprises a core 20 formed from the one of the material phases, that is surrounded by a shell or casing 22 formed from the other of the material phases. The core can be formed from the hard or soft material phase, depending on the specific application. In an example embodiment, the core is formed from the hard material phase and the shell is formed from the relatively softer material phase. The shell or casing can be applied to each respective core by the method described in U.S. Pat. No. 4,772,524, or by other well known spray or coating processes. Additionally, "Flaw Tolerant, Fracture Resistant, Non-Brittle Materials Produced Via Conventional Powder Processing," (*Materials Technology*, Volume 10 1995, pp. 131-149), which is also incorporated herein by reference, describes an extrusion method for producing such coated fibers 18.

In an example embodiment, the multi-material phase component 16 comprises a core 20 of tungsten carbide and cobalt powder surrounded by a shell 22 of cobalt metal. A green-state component 16 having the ordered shell and core arrangement is produced in the following manner. The fibers are fabricated from a mixture of powdered WC-Co, powdered Co, and thermoplastic binder such as wax by the extrusion process identified above. In an example embodiment, the fibers 18 have a WC-Co core 20 thickness in the range of from about 30 to 300 micrometers, surrounded by a shell 22 of cobalt having a thickness in the range of from about 3 to 30 micrometers. The binder may be as much as 50 percent by volume of the total mixture. Tungsten carbide powder and cobalt powder are available in micron or submicron sizes, although it is desired that the tungsten carbide powder have a particle size of less than about 20 micrometers.

As will be better described below, the extruded green-state component is then chopped up to form granules having a desired granule length in the range of from about 50 to 1,000 micrometers, and more preferably in the range of from about 70 to 200 micrometers. While the green-state component used to form the granules has been disclosed and illustrated as being generally cylindrical in configuration, it is to be understood that such components can be configured having other geometrically-configured shapes such as hexagonal, square, triangular and the like, as defined by the particular composite construction application.

Each so-formed granule has an ordered arrangement of a core formed from a first material phase, and a shell surrounding the core formed from a second material phase. The granules are then combined together in random fashion while in the green state to provide a green-state composite construction. The green-state product is then dewaxed by heating in a vacuum or protective atmosphere to remove the thermoplastic binder. The dewaxed green-state product, having retained its randomly-oriented microstructure, is further heated to an elevated temperature near the melting point of cobalt, to form a solid, essentially void-free integral composite construction having the desired randomly-oriented material microstructure.

Although use of a cemented tungsten carbide material and cobalt have been described above as example respective component hard phase and binder phase materials, it is to be understood that such components useful for forming composite constructions of this invention may be formed from many other different materials that are discussed in detail below. For example, such components can comprise a hard phase formed from PCD or PCBN, and a relatively softer phase formed from the same general material or from a different material such as cemented tungsten carbide or cobalt metal. In such example, the core 20 can be formed from a PCD or PCBN composition according to the process described in U.S. Pat. Nos. 4,604,106; 4,694,918; 5,441,817; and 5,271,749 that are each incorporated herein by reference, starting with diamond or cBN powder and wax. Each PCD core 20 is surrounded by a cemented tungsten carbide or cobalt metal shell 22 to form the fiber 18. In an example embodiment, the fibers have a PCD core thickness in the range of from about 30 to 300 micrometers, and the shell has a thickness in the range of from about 3 to 30 micrometers.

Figure 3:
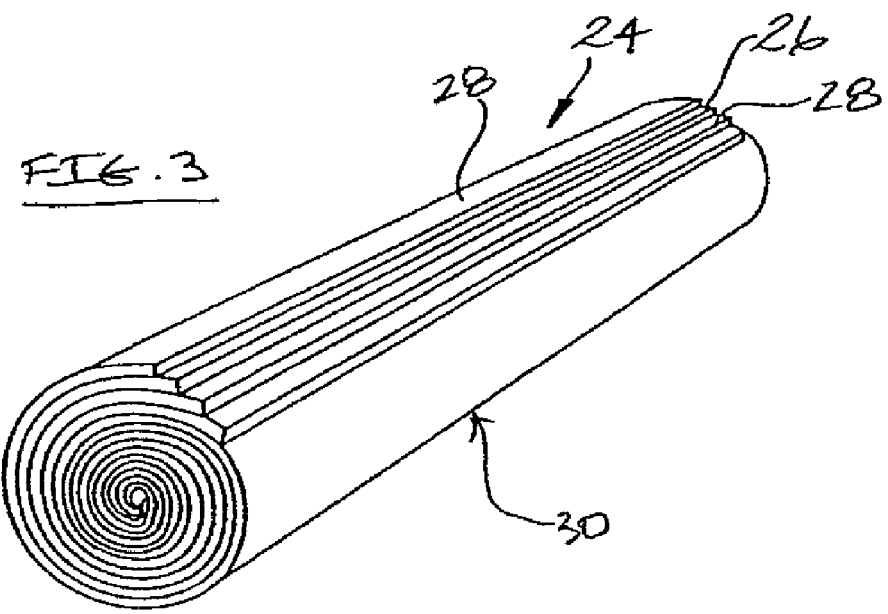
FIG. 3 is a perspective cross-sectional side view of a second embodiment ordered multi-material phase component useful for forming randomly-oriented composite constructions of this invention.

FIG. 3 illustrates a second embodiment ordered multi-material phase component 24 useful for forming composite constructions of this invention. The component 24 comprises a repeating ordered arrangement of monolithic sheets of a hard material phase 26, and sheets of a relatively softer material phase 28 that can be stacked one on top of another, or that can be arranged to produce a swirled or coiled composite construction. In an example embodiment, the green-state component 24 comprises sheets 26 that are formed from a powdered cermet material, and sheets 28 that are formed from a powdered metal. A thermoplastic binder is added to both powder sheets 26 and 28 for cohesion and to improve the adhesion between the adjacent sheets. The sheets 26 of the hard material phase and the sheets 28 of the binder material phase are alternately stacked on top of one another and coiled into a rod 30 having a spiral cross section. Additionally, depending on the desired composite construction properties for a particular application, the sheets 26 and 28 may be formed from more than one type of hard material and/or more than one type of binder material phase, and can be stacked in random fashion, to form the second embodiment component 24.

In an example embodiment, the sheets 26 are formed from powdered WC-Co, and the sheets 28 are formed from powdered cobalt. Alternatively, the sheets 26 can be formed from PCD or PCBN, and the sheets 28 can be formed from a relatively more ductile binder material such as metals, metal alloys, cermets and the like. The WC-Co sheets 26 are formed having a thickness in the range of from about 50 to 300 micrometers, and the cobalt sheets 28 are formed having a thickness in the range of from about 5 to 10 micrometers after consolidation.

As will be better described below, the coiled green-state component is then chopped up to form granules having the desired granule length noted above. Each so-formed granule has an ordered arrangement of sheets 26 and 28 coiled around one another. The granules are then combined together in random fashion while in the green state to provide a green-state composite construction. The green-state product is then dewaxed by heating in a vacuum or protective atmosphere to remove the thermoplastic binder. The dewaxed green-state product, having retained its randomly-oriented microstructure, is further heated to an elevated temperature near the melting point of cobalt, to form a solid, essentially void-free integral composite construction having the desired randomly-oriented material microstructure.

Figure 4:
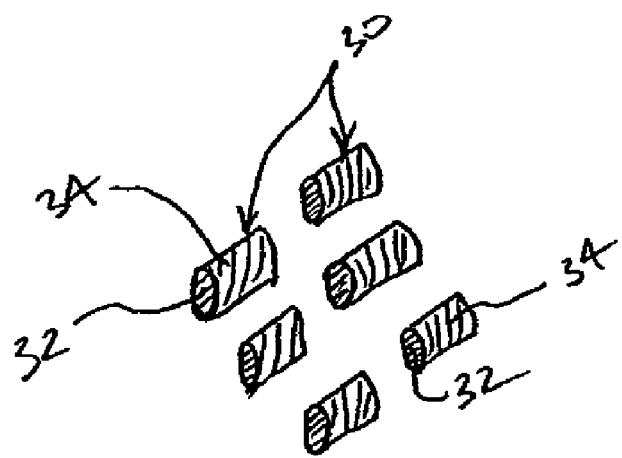
FIG. 4 is a schematic view of a number of granules formed from the first embodiment ordered multi-material phase component of FIG. 2.

FIG. 4 illustrates a number of granules 30 that are formed from the first embodiment ordered multi-material phase component discussed above and illustrated in FIG. 2. The granules 30 are formed while the component is in the green state, and the specific granule size is understood to vary depending on the particular composite construction application. Each granule 30 comprises an ordered arrangement of first and second material phases. Specifically, the granule core 32 is formed from the first material phase, and the granule shell 34 surrounding the core is formed from the second material phase.

Figure 5:
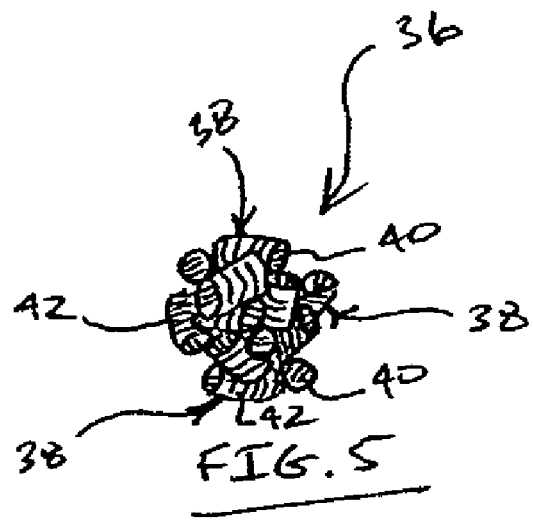
FIG. 5 is a schematic photomicrograph of a region of a first embodiment randomly-oriented composite construction of this invention comprising a combined plurality of the granules of FIG. 4.

FIG. 5 illustrates a region of a first embodiment randomly-oriented composite construction 36 of this invention comprising a three-dimensional arrangement of granules 38 that have been combined with one another in a random fashion. As illustrated, this composite is characterized by bonding that takes place between the adjacent surfaces of the granules themselves, e.g., between adjacent granule core portions 40, between adjacent granule shell portions 42, and between adjacent granule core 40 and shell 42 portions, depending on the particular orientation of the granules relative to one another.

It is theorized that this random arrangement of differently bonded together granules, each comprising an ordered arrangement of material phases, operates to provide a tortuous and/or discontinuous path within the material microstructure to help deflect, absorb, and blunt cracks that may travel therethrough, thereby operating to control crack propagation and provide a composite construction having properties of improved fracture toughness and resistance to chipping reduce crack propagation when compared to conventional cermet constructions.

Randomly-oriented composite constructions of this invention have crack inhibiting structures both on the micro and macro scale. On the micro scale, the ordered microstructure of the particles operate to inhibit cracks on the surface. In an example embodiment, where the ordered microstructure is provided in the form core and shell configuration, this ordered material microstructure presents a first layer of crack propagation resistance due to the changing material properties (e.g., stiffness and toughness) that is developed locally. This type of ordered material structure is known to display improved diamond retention due to the minimization of cracking, and hence minimization of spalling. Composite constructions of this invention take advantage of such improved properties associated with the ordered microstructure and then improve on them. Specifically, by taking the core and shell ordered structure, chopping the structure into granules, and then combining the granules together in a random fashion. On a macro scale, this random combination of ordered granules operates to further interrupt and inhibit crack propagation between the granules (through core-to-core, core-shell, or shell-shell interaction) and, thus through the structure.

Figure 6:
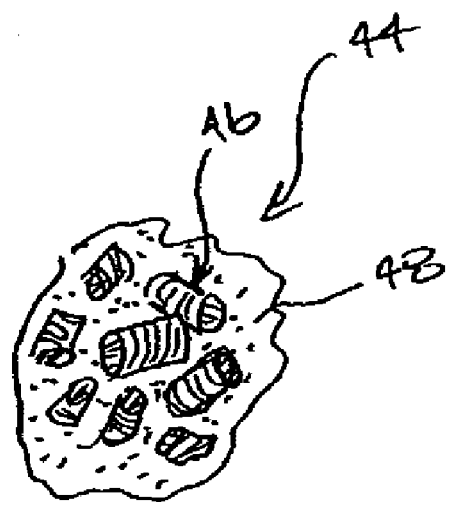
FIG. 6 is a schematic photomicrograph of a region of a second embodiment randomly-oriented composite construction of this invention comprising a combined plurality of the granules of FIG. 4 disposed within a continuous matrix binder material.

FIG. 6 illustrates a region of a second embodiment randomly-oriented composite construction 44 of this invention comprising a three-dimensional arrangement of granules 46 that have been combined with one another in a random fashion. Unlike the first embodiment composite construction described above and illustrated in FIG. 5, this second embodiment composite construction 44 comprises the plurality of randomly-oriented granules 46 disposed within a continuous matrix binder phase 48. The binder phase 48 can be formed from the same types of materials useful for forming the granule first or second material phases; and is used to provide an insulating phase between the granules, bonding the granules to one another.

As illustrated in FIG. 6, this second embodiment composite construction is characterized by bonding that takes place between the insulating binder phase 48 and the plurality of granules 46. Accordingly, rather than the granule core and shell portions being bonded to core and/or shell portions of adjacent respective granules, the granule and core portions are ideally bonded only to the binder phase material. It is to be understood, however, the there may be some locations in the material microstructure where granule-to-granule bonding does occur.

In this particular embodiment, it is theorized that random arrangement of granules, each comprising an ordered arrangement of material phases, in combination with the insulating continuous binder phase operates to provide an enhanced crack propagation path within the composite, thereby providing a composite construction having properties of improved fracture toughness and resistance to chipping to control and reduce crack propagation when compared to conventional cermet constructions. In this particular embodiment, the ordered material phase of the granules operates as described above to inhibit crack propagation. Additionally, the insulating binder operates to still further inhibit crack propagation by physically separating the randomly arrange of granules from one another.

Composite constructions of this invention are unique in that they comprise a randomly-oriented microstructure made from components that themselves have an ordered arrangement of multiple material phases. The combined random arrangement of granules, on a relatively macro scale, that each have an ordered material phase on a relatively micro scale, produces a synergistic effect that operates to provide improved performance properties of wear resistance, resistance to chipping and fracture toughness that exceeds those of either exclusively randomly-oriented or exclusively ordered composite compositions.

In order to ensure the production of a final composite composition having these improved properties, it is essential that the desired combination of a randomly-oriented arrangement of granules themselves having an ordered arrangement of material phase be retained during the process of making the composite construction. Thus, composite constructions of this invention are made by first constructing green-state components, e.g., granules, having the desired ordered arrangement of two or more material phases, combining the granules in a randomly-oriented manner, and then consolidating and sintering the combined green-state granules. To ensure the desired microstructure of the finished composite construction, it is important that each of the above-noted steps be carried out so that the random and ordered features of the construction be maintained, i.e., in a manner that does not permit appreciable migration between the material phases.

As noted above, a processing agent or binder material can be used to aid in the process of forming the green state components. Such processing agent can be used to help form one or both granule material phases and/or to help form the composite construction itself. Suitable processing agents include thermoplastic materials, thermoset materials, aqueous and gelation polymers, as well as inorganic binders. Suitable thermoplastic polymers include polyolefins such as polyethylene, polyethylene-butyl acetate (PEBA), ethylene vinyl acetate (EVA), ethylene ethyl acetate (EEA), polyethylene glycol (PEG), polysaccharides, polypropylene (PP), poly vinyl alcohol (PVA), polystyrene (PS), polymethyl methacrylate, poly ethylene carbonate (PEC), polyalkylene carbonate (PAC), polycarbonate, poly propylene carbonate (PPC), nylons, polyvinyl chlorides, polybutenes, polyesters, waxes, fatty acids (stearic acid), natural and synthetic oils (heavy mineral oil), and mixtures thereof.

Suitable thermoset plastics include polystyrenes, nylons, phenolics, polyolefins, polyesters, polyurethanes. Suitable aqueous and gelation systems include those formed from cellulose, alginates, polyvinyl alcohol, polyethylene glycol, polysaccharides, water, and mixtures thereof. Silicone is an example inorganic polymer binder. An exemplary polymer binder for forming the green-state fiber component is ethylene vinyl acetate and heavy mineral oil, which is preferred because of its ability to be extruded and pultruded in fine fibers. In addition, the backbone (EVA) is insoluble in heptane and alcohol.

Consolidation techniques useful for forming composite constructions of this invention include solid-state consolidation methods such as hot pressing, hot isostatic pressing (HIPing) as described in U.S. Pat. No. 5,290,507 that is incorporated herein by reference, and rapid omnidirectional compaction (ROC) as described in U.S. Pat. Nos. 4,945,073; 4,744,943; 4,656,002; 4,428,906; 4,341,577 and 4,124,888 which are each incorporated herein by reference.

Broadly speaking, the ROC process can be used to form composite constructions of this invention and involves pressing the green-state product, i.e., the randomly-oriented arrangement of granules in a closed die to a desired shape, such as a rock bit insert or a cap that forms a working surface of a rock bit insert. The resulting "green" insert is then vacuum dewaxed and presintered at a relatively low temperature to achieve a density appreciably below full theoretical density. The presintering is only sufficient to permit handling of the insert for subsequent processing. The green insert is wrapped in a first container and is then placed in second container made of a high temperature high pressure self-sealing ceramic material. The second container is filled with a special glass powder and the green part disposed within the first container is embedded in the glass powder. The glass powder has a lower melting point than that of the green part, or of the ceramic die.

The second container is placed in a furnace to raise it to the desired consolidation temperature, that is also above the melting point of the glass. For example, for a green state composite construction comprising a random arrangement of granules made up of a WC-Co hard phase and cobalt ductile metal phase system, the consolidation temperature is in the range of from 1,000° C. to 1,280° C. The heated second container with the molten glass and green part immersed inside is placed in a hydraulic press having a closed cylindrical die and a ram that presses into the die. Molten glass and the green part are subjected to high pressure in the sealed ceramic container. The part is isostatically pressed by the liquid glass to pressure as high as 120 ksi. The temperature capability of the entire process can be as high as 1,800° C. The high pressure is applied for a short period of time, e.g., less than about five minutes and preferably one to two minutes, and isostatically compacts the green part to essentially 100 percent density.

Conventional liquid phase consolidation techniques are generally not thought to be useful for forming composite constructions of this invention because of the tendency for the binder material within the granules to migrate, thereby causing the granule ordered material phases to become distorted or unoriented. However, liquid phase consolidation techniques may be used that operate under conditions of reduced temperature. For example, reactive liquid phase sintering relates to a process whereby one or more of the constituent elements is capable of releasing energy upon formation (i.e., enthalpy formation is high). This energy is released as heat which can (if conditions are proper) produce a self-propagating reaction that will consolidate the component at a relatively low temperature (that being the temperature needed to initiate the reaction). Thus, randomly-oriented composite constructions of this invention can be formed using such technique if one of the granule material phases contains an element that, upon reaching an ignition temperature, will operate to densify the entire component. This technique is nonreversible, meaning that the reaction product will not go to liquid due to an increased melting point of the compound in comparison to its constituent elements.

Supersolidus liquid phase sintering is another technique that can be used to consolidate composite constructions of this invention, whereby a composition will yield upon heating a mixture of liquid and solid phases. This technique has the advantage over conventional liquid phase sintering of allowing for densification at lower temperatures and provides for improved control over distortion since the operating temperature dictates the yield of the liquid. Hence a composition can be contrived where one phase develops supersolidus liquid phase sintering conditions and infiltrates another phase, thereby causing the entire structure to densify. Alternatively, each of the granule material phases forming the composite construction can have materials capable of supersolidus liquid phase sintering.

Other solid-state consolidation techniques useful for making composite constructions of this invention include those incorporating a rapid heating step such as microwave sintering, plasma-activated sintering, and other types of field-assisted sintering. Each of these techniques are effective at producing a final composite construction having the retained randomly-oriented granule microstructure.

Examples of consolidation techniques using rapid heating methods include field-assisted sintering and laser heating. Field-assisted sintering uses an electromagnetic field to generate rapid heating and improved surface transport. Often time, energy that is provided from the electromagnetic field is concentrated on surface asperities. Several heating techniques for conducting field-assisted sintering exist, including but not limited to induction heating, microwave, plasma and electric discharge. Induction sintering uses alternating current to create a magnetic field within the material to induce eddy currents. These eddy currents serve to rapidly heat a component.

Similarly, microwave sintering allows for rapid heating of a component based on its (or susceptor) material properties. A susceptor is a material that will do the heating by either induction or microwave process when the compact is either nonconductive or transparent to microwave. Besides rapid heating, microwave sintering is believed to provide lower activation energies for diffusion and promote steep concentration gradients (operating to further increase diffusivity). Microwave sintering or microwave-assisted sintering are consolidation techniques, typically carried out at ambient pressure conditions, which enhances densification because of rapid heating and homogenization of the part's internal temperature and creation of plasma at all powder asperities to create an enhanced surface.

Laser heating is another approach that can be used to primarily sinter a thin section of powder (wherein the depth of penetration is very limited) and, hence, is often used for rapid prototyping machines that build layer by layer.

Electrical discharge heating is used to heat a component via electrical resistance. Typically, a hot press is employed since constant contact (pressure) is needed and graphite promotes electrical conduction/heating of a component. When the electric filed is pulsed, plasma is generated therefrom at the asperities. Likewise, plasma sintering is similar in that an electromagnetic field is generated resulting in an enhanced diffusion. A secondary type of plasma sintering is to induce an external plasma using RF heating of gaseous species to promote localized heating and concentration gradients. However, this system is not as advantageous as the system described below due to the lack of applied pressure.

Plasma-assisted sintering is a technique whereby plasma is generated within the powder compact. This plasma enhances surface activated diffusion, which promotes densification at lower sintering temperatures and/or promotes shorter sintering times. The instantaneous electric pulses using high currents generate the plasma. Often the plasma-assisted sintering is operated effectively applied to hot pressing, where the electric field pulses are delivered to the compact axially through the use of graphite compaction rods. This technique is also referred to as field-assisted sintering. Field strengths vary for different materials, but generally range in from 18 to 50 V/cm.

Composite constructions having a material microstructure consisting of randomly-oriented granules, prepared according to principles of this invention, exhibit an improved degree of fracture toughness and chipping resistance when compared to conventional cermet materials such as cemented tungsten carbide, due to the synergistic effect of the plurality of randomly-arranged granules (on the relatively macro scale), and ordered material phases of the granules (on the relatively micro scale).

Materials useful for forming the granule hard material phase can be selected from the group of cermet materials including, but not limited to, carbides, borides and nitrides of the group IVB, VB, VIB, VIIB, and VIII metals and metal alloys of the periodic table (CAS version). Example cermet materials include: WC-M, TiC-M, TaC-M, VC-M, and $Cr_3C_2$-M, where M is a metal such as Co, Ni, Fe, or alloys thereof as described above. A preferred cermet material is WC-Co. The granule hard material phase can also be formed from PCD, HBN, CBN, PCBN, and mixtures of these materials with carbides, borides and nitrides of the group IVB, VB, VIB, VIIB, and VIII metals and metal alloys of the periodic table CAS version). Composite constructions of this invention comprising granules having PCD as the hard material phase are highly desirable in aggressive drilling applications that call for extreme wear resistance.

In addition to the materials noted above, the granule hard phase materials can also be formed from a composite construction, i.e., a material comprising an ordered or random arrangement of two or more distinct material phases. Composite constructions useful in this regard include those having a double cemented material microstructure. The term "double cemented" as used here refers to the fact that the material microstructure for such construction comprises a plurality of first phases made up of a cemented material, i.e., a number of hard phase particles bonded to one another via a binder phase, and these first phases are distributed within a substantially continuous second or binder phase. In an example embodiment, the plurality of first phases are formed from WC-Co, and the second or binder phase is cobalt.

Because each first phase comprises hard grains bonded together or cemented by a metallic cementing agent, and the first phases are themselves disposed within a second metallic cementing agent, the overall material microstructure is referred to as being double cemented. Example double cemented cermet constructions useful for forming the granule hard material phase include those disclosed in U.S. Pat. No. 5,880,382, which is incorporated herein by reference, and which have a material microstructure comprising a plurality of first phases (each formed from the same types of cermet materials discussed above) that are distributed within a substantially continuous matrix second phase that is formed from a relatively more ductile material (such as those material discussed above useful for forming the cermet metallic cementing agent).

Double cemented composite constructions useful for forming the granule hard phase can also include PCD, HBN, CBN and PCBN. An example of such construction is one comprising a plurality of first phases in the form of granules comprising PCD, HBN, CBN, of PCBN, wherein the granules are formed by combining a requisite hard grain with a binder material, and wherein the granules are distributed within a substantially continuous matrix binder phase. In an example embodiment, the double cemented composite construction comprises a plurality of granule phases formed from PCD, and the continuous matrix binder phase is WC-Co, as disclosed and prepared according to U.S. Pat. No. 6,454,027, which is incorporated herein by reference.

Materials useful for forming the granule relatively softer or binder material include those materials disclosed above for forming the hard material phase, or different materials. In the event that the selected granule relatively softer or binder material phase is the same as that used to form the granule hard material phase, it is desired that the proportion and/or the grain size of the selected binder material be adjusted so that it be relatively softer or more ductile than the hard material phase. For example, when both the granule hard and soft material phases are selected to be WC-Co, the soft material phase WC-Co can have a higher proportion of cobalt than the hard material phase WC-Co, and/or the soft material phase WC-Co can have a WC grain size that is smaller than that of the hard material phase WC-Co to provide a material phase that is relatively softer or more ductile than the hard phase material. Accordingly, it is to be understood that composite constructions of this invention can be configured having microstructure of randomly-oriented granules comprising two or more material phases formed from the same general type of material.

The granule relatively softer material phase can also be formed from a material that is different than that used to form the hard phase material. Accordingly, materials useful for forming the granule relatively softer phase include those selected from the group IIIA, IVB, VB, VIB, VIIB, and VIII metals and metal alloys of the periodic table (CAS version), such as Fe, Ni, Co, Cu, Ti, Al, Ta, Mo, Nb, W, and their alloys. Additionally, the binder phase can be formed from the group including carbides, borides and nitrides of the group IVB, VB, VIB, VIIB, and VIII metals and metal alloys of the periodic table (CAS version), when the granule hard phase material (e.g., the fiber core) is PCD or PCBN because of their properties of good thermal expansion compatibility and good toughness. For example, the granule binder phase can be WC-Co when the granule hard phase material is PCD or PCBN. In an example embodiment, a desired binder phase is cobalt when the hard phase material is WC-Co. The above provided materials useful for forming the granule binder phase material can also be used to form the continuous matrix binder phase between the granules in the second embodiment randomly-oriented composite constructions of this invention as illustrated in FIG. 6.

The volume fraction of the continuous binder phase in the second embodiment composite construction will influence the properties of the overall composite construction, including wear resistance, fracture toughness and chipping resistance. The volume fraction of the continuous binder phase may be in the range of from about 15 to 50 percent by volume, based on the total volume of the composite construction. Preferably, for composite constructions designed for use in more demanding applications, the binder phase can be in the range of from about 15 to 30 percent by volume of the total volume of the composite.

Composite constructions having a material microstructure of randomly-oriented granules, prepared according to principles of this invention, will be better understood and appreciated with reference to the following example:

EXAMPLE

Randomly-Oriented PCD Composite Construction

A green-state fiber component was constructed by extrusion process comprising a core formed from diamond grains having a desired content of binder metal, e.g., cobalt, and having a grain size of from about 1 to 50 mm. The fiber also had a shell surrounding the core that was formed from tungsten carbide-cobalt or diamond grains having material properties different from that of the diamond core. The fiber had a pre-consolidation outside diameter of approximately 1 mm, a core diameter of approximately 80 μm, and a shell thickness of approximately 16 μm. The fiber was chopped into granules having an average axial length of approximately 500 to 1000 μm. The granules were loaded into a rod mold and consolidated at a temperature of approximately 180° C. and a pressure of approximately 42 MPa. The consolidated green-state product was then sintered by high-temperature, high-pressure process at approximately 1,400° C., and approximately 5,500 MPa for approximately 120 seconds.

The so-formed randomly-oriented composite construction displayed a hardness in the range of between 3,000 and 3,600 HV (n=16; wherein HV is the hardness units for Vikers hardness), and a granite log wear resistance in the range of between 0.25 and $0.65 \times 10^6$ (n=4; wherein the unit of measurement of wear resistance is volume of granite removed divided by volume of working surface removed), where higher is more wear resistance.

Composite constructions of this invention are well suited to serve in applications calling for combined properties of both improved wear resistance and improved fracture toughness, such as tools for mining, machining and construction applications, where the combined mechanical properties of high fracture toughness, wear resistance, and hardness are highly desired. Composite constructions of this invention can be used to form working, wear and/or cutting components in machine tools and drill and mining bits such as roller cone rock bits, percussion or hammer bits, diamond bits, and substrates for shear cutters.

Figure 7:
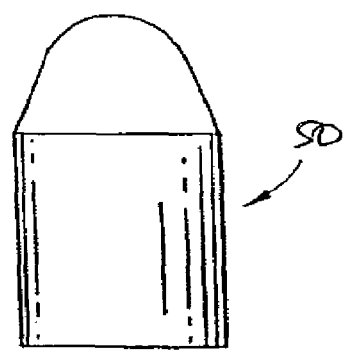
FIG. 7 is a perspective side view of an insert for use in a roller cone or a hammer drill bit comprising a randomly-oriented composite construction of this invention.

For example, FIG. 7 illustrates an insert 50 for use in a wear or cutting application in a subterranean drilling bit, such as a roller cone drill bit, percussion or hammer drill bit. The insert 50 itself or a portion of its surface may be formed from the composite constructions of this invention. For example, such inserts can be formed from blanks that are made from composite constructions of this invention, and that are pressed or machined to the desired shape of a roller cone rock bit insert. The shaped inserts are then heated to about 200 to 400° C. in vacuum or flowing inert gas to debind the composite, and the inserts are then sintered at an elevated temperature below the melting point of the binder phase material, in this case below the melting temperature of cobalt.

Figure 8:
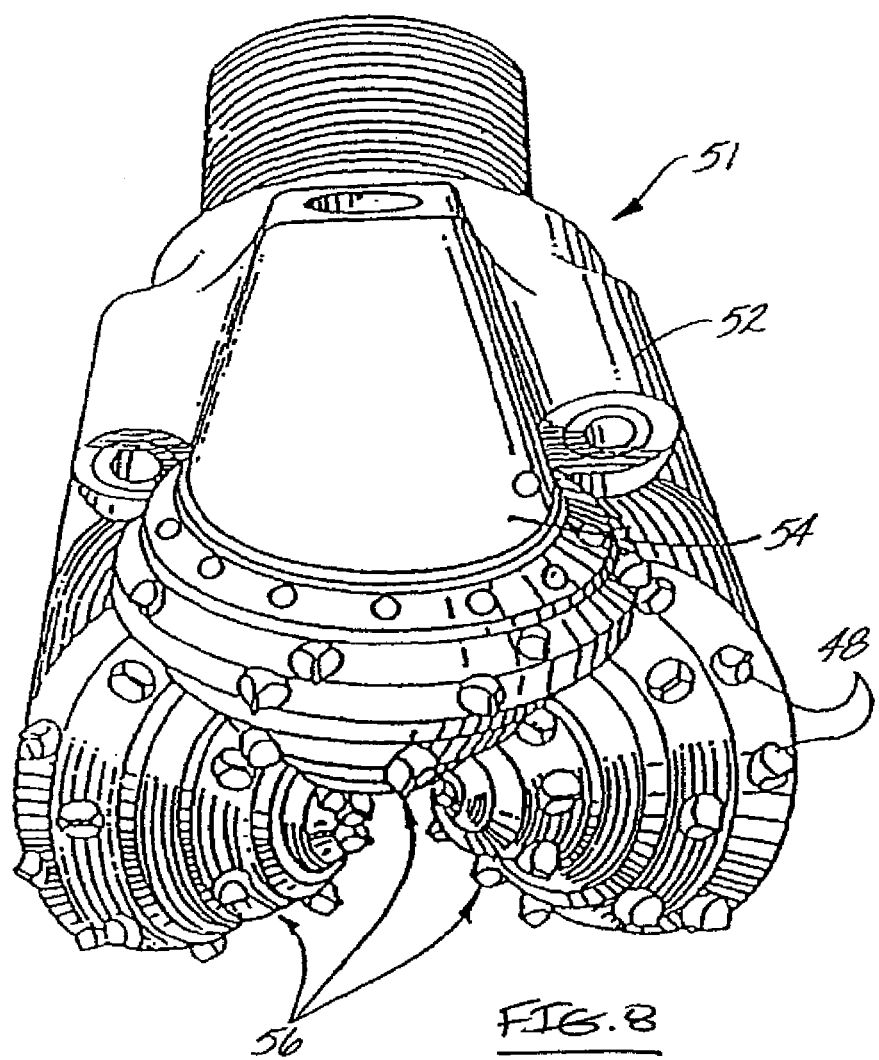
FIG. 8 is a perspective side view of a roller cone drill bit comprising a number of the inserts of FIG. 7.

For example, referring to FIG. 8, wear or cutting inserts 50 (shown in FIG. 7) formed from composite constructions of this invention can be used with a roller cone rock bit 51 comprising a body 52 having three legs 54, and a roller cutter cone 56 mounted on a lower end of each leg. The inserts 50 can be fabricated according to one of the methods described above. The inserts 50 are provided in the surfaces of the cutter cone 56 for bearing on a rock formation being drilled.

Figure 9:
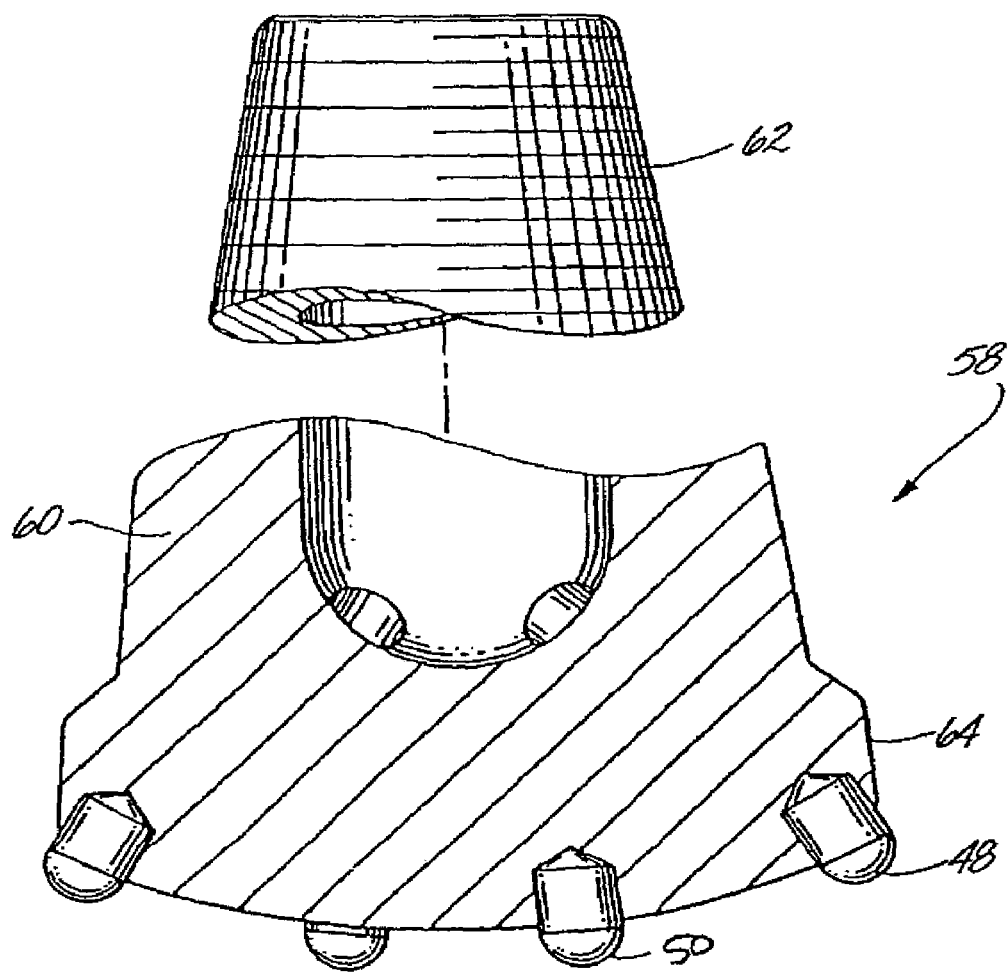
FIG. 9 is a perspective side view of a percussion or hammer bit comprising a number of inserts of FIG. 7.

Referring to FIG. 9, inserts 50 formed from composite constructions of this invention can also be used with a percussion or hammer bit 58, comprising a hollow steel body 60 having a threaded pin 62 on an end of the body for assembling the bit onto a drill string (not shown) for drilling oil wells and the like. A plurality of the inserts 48 are provided in the surface of a head 64 of the body 60 for bearing on the subterranean formation being drilled.

Figure 10:
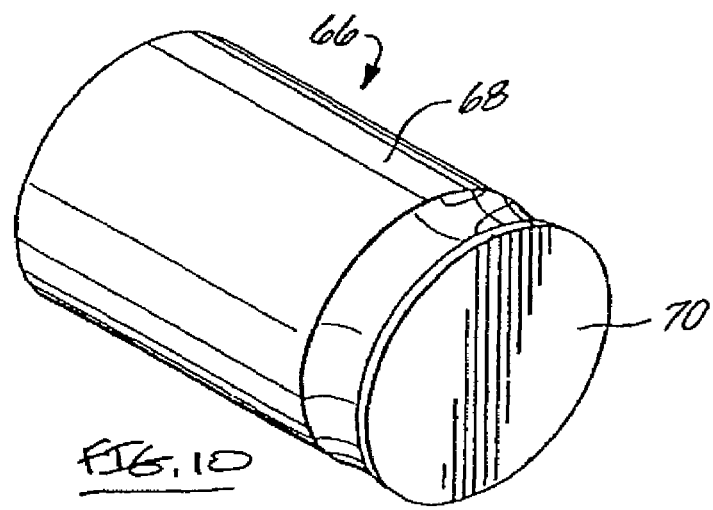
FIG. 10 is a schematic perspective side view of a polycrystalline diamond shear cutter comprising a substrate and/or cutting surface formed a randomly-oriented composite construction of this invention.

Referring to FIG. 10, composite constructions of this invention can also be used to form PCD shear cutters 66 that are used, for example, with a drag bit for drilling subterranean formations. More specifically, composite constructions of this invention can be used to form a shear cutter substrate 68 that is used to carry a layer of PCD 70 that is sintered thereto or, alternatively, the entire substrate and cutting surface can be made from the composite construction.

Figure 11:
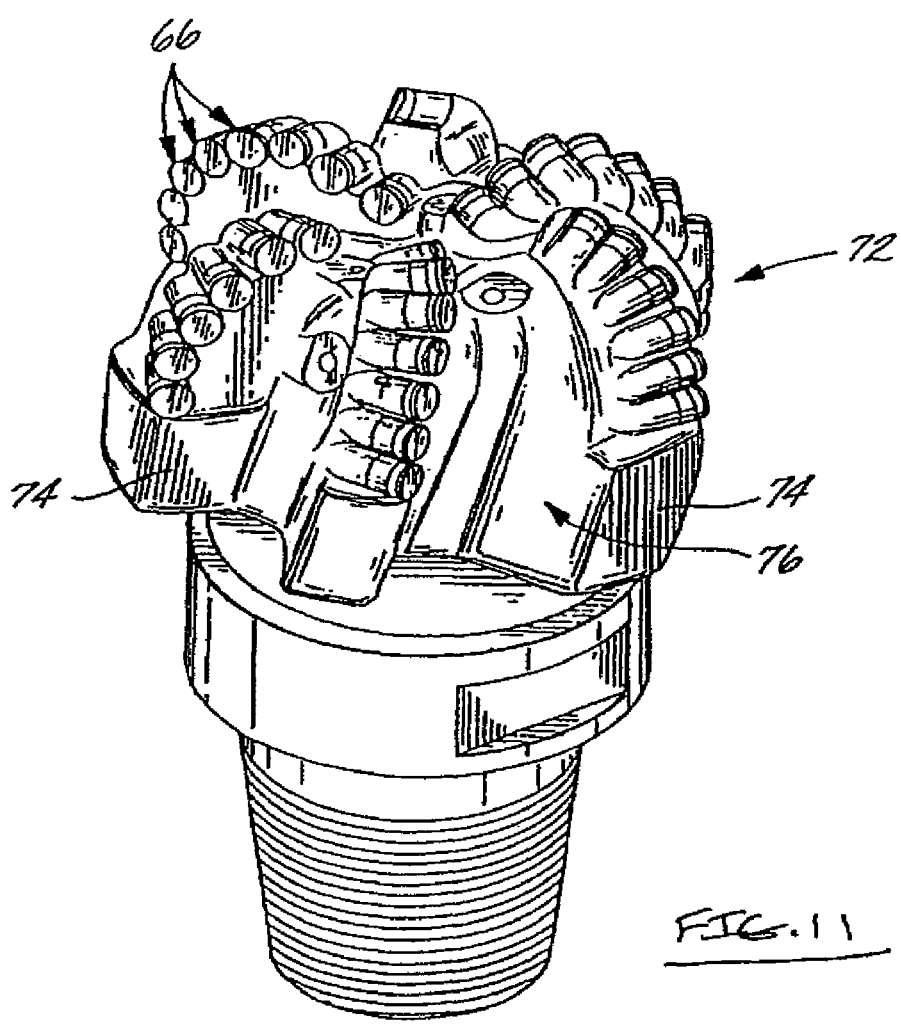
FIG. 11 is a perspective side view of a drag bit comprising a number of the shear cutters of FIG. 10.

Referring to FIG. 11, a drag bit 72 comprises a plurality of such PCD shear cutters 66 that are each attached to blades 74 that extend from a head 76 of the drag bit for cutting against the subterranean formation being drilled.

Although, limited embodiments of composite constructions having a material microstructure of randomly-arranged granules, each having an ordered arrangement of two or more material phases, methods of making the same, and applications for the same, have been described and illustrated herein, many modifications and variations will be apparent to those skilled in the art. For example, although composite constructions have been described and illustrated for use with rock bits, hammer bits and drag bits, it is to be understood that composites constructions of this invention are intended to be used with other types of mining and construction tools comprising wear or cutting surfaces. Accordingly, it is to be understood that within the scope of the appended claims, composite constructions according to principles of this invention may be embodied other than as specifically described herein.

What is claimed is:

1. A bit for drilling subterranean formations comprising a body and a number of cutting elements connected to the body, wherein one or more of the cuffing elements comprises a composite construction comprising a plurality of first regions and a second region that surrounds at least a portion of the first regions, wherein composite construction is formed by the process of:
   combining a plurality of randomly arranged granules each comprising a first material phase and a second material phase, wherein the first and second material phases are in contact with one another and are oriented relative to one another the same within each granule, wherein the granule first and second material phases are formed from materials selected from the group consisting of polycrystalline diamond, polycrystalline cubic boron nitride, precursors of these materials, and mixtures thereof, and wherein the granule second material phase is relatively more ductile than the granule first material phase in sintered form; and
   subjecting the combined randomly arranged granules to elevated pressure and temperature conditions to form the composite construction.

2. The bit as recited in claim 1 wherein the plurality of first phases comprises diamond crystals.

3. The bit as recited in claim 2 wherein the second phase comprises diamond crystals.

4. The bit as recited in claim 2 wherein the volume content of diamond crystals in the first phase is different from that in the second phase.

5. The bit as recited in claim 2 wherein the diamond grains used to form the granule first material phase have an average size that is different from the diamond grains used to form the granule second material phase.

6. The bit as recited in claim 1 wherein the granule first material phase is a core and the granule second material phase is a shell that surrounds at least a portion of the core.

7. The bit as recited in claim 1 wherein after the step of combining the granules, at least a portion of the first or second material phase of one or more granules is in contact with a portion of a same material phase of an adjacent granule.

8. The bit as recited in claim 1 wherein the composite construction further comprises a third region that is substantially continuous, and wherein the plurality of first regions and the second region surrounding the plurality of second regions are disposed within the third region.

9. The bit as recited in claim 8 wherein the third region is formed from cermet materials, polycrystalline diamond, polycrystalline cubic boron nitride, precursors of these materials, and mixtures thereof.

10. The bit as recited in claim 1 further comprising a number of blades extending outwardly from the body, and wherein the number of cutting elements are attached to one or more of the blades.

11. The bit as recited in claim 1 wherein the body includes:
   at least one journal pin extending from a leg of the body; and
   a cutter cone rotatably mounted on the pin;
   wherein the cutting elements are attached to the cone.

12. A composite construction comprising a sintered plurality of randomly oriented granules forming a material microstructure comprising a plurality of first regions disposed within a substantially continuous second region, wherein the first regions are formed from granule cores selected from the group of materials consisting of [cermet materials,] polycrystalline diamond, polycrystalline cubic boron nitride, precursors of these materials, and mixtures thereof, and the second region is formed from granule shells disposed around at least a portion of a respective granule cores, the granule shells being selected from the group of materials consisting of [cermet materials,] polycrystalline diamond, polycrystalline cubic boron nitride, precursors of these materials, and mixtures thereof, and wherein at least a portion of the core or shell of one or more, granules is in contact with a portion of the core or shell of an adjacent granule.

13. The composite construction as recited in claim 12 wherein the composite construction comprises a cellular construction wherein the plurality of first regions are substantially surrounded by the second region.

14. The composite construction as recited in claim 12 wherein the first and second regions each comprise diamond crystals.

15. The composite construction as recited in claim 14 wherein the diamond volume content in the first region is different than the diamond volume content in the second region.

16. The composite construction as recited in claim 14 wherein the average diamond crystal size in the first region is different than the average diamond crystal size in the second region.

17. A method for making a composite construction comprising a cellular material microstructure including a plurality of first regions disposed within a second region comprising the steps of:
   combining a plurality of randomly arranged granules each comprising a core phase and a shell phase that is in contact with and at least partially surrounds the core phase, wherein the core and shell phases of each granule are positioned the same relative to one another for each granule, wherein the granules are combined so that a core or shell phase of one or more granules is in contact with the core or shell phase of one or more adjacent granules, wherein the core and shell phases are formed from materials selected from the group consisting of [cermet materials,] polycrystalline diamond, polycrystalline cubic boron nitride, precursors of these materials, and mixtures thereof, wherein the core phase is formed from a material having a sintered hardness different from that of the shell phase;
   subjecting the combined plurality of granules to elevated pressure and temperature conditions to consolidate and sinter the granules to form the composite construction.

18. The method as recited in claim 17 wherein a population of the composite construction plurality of first regions are completely surrounded by the second region.

19. The method as recited in claim 17 wherein the granule core and shell phase each comprise a diamond material.

20. The method as recited in claim 19 wherein the granule core comprises a diamond volume content that is different from that of the granule shell.

* * * * *